UNITED STATES PATENT OFFICE.

WILLIAM A. FAIRBURN, OF SHORT HILLS, NEW JERSEY, ASSIGNOR TO THE DIAMOND MATCH COMPANY, OF CHICAGO, ILLINOIS, A CORPORATION OF ILLINOIS.

MATCH-HEAD COMPOSITION AND METHOD OF MAKING SAME.

1,360,282.  Specification of Letters Patent.  Patented Nov. 30, 1920.

No Drawing.  Application filed August 12, 1915.  Serial No. 45,102.

*To all whom it may concern:*

Be it known that I, WILLIAM A. FAIRBURN, a citizen of the United States, and resident of Short Hills, in the county of Essex and State of New Jersey, have invented certain new and useful Improvements in Match-Head Compositions and Methods of Making Same, of which the following is a specification.

This invention relates to a match-head composition and also to a process of preparing the same.

The primary object of my invention is to provide for the practical and efficient use of sodium chlorate as an oxidizing agent in match composition, which salt as is well known is extremely hygroscopic. In the production of "double-dipped" matches, the first head or bulb, if sodium chlorate be employed therein, must be artificially dried before the tip of sensitive igniting composition can be applied thereto; and even then the sodium chlorate content (unless the head be provided with a protective coating) rapidly absorbs moisture in a humid atmosphere and the match is rendered useless.

In pursuance of my invention I intimately associate with the sodium chlorate before it is used in match composition a metal which will counteract or overcome the hygroscopic tendency of the salt. I have discovered that the commercial zinc-dust well subserves this purpose; although some other materials, such, for example, as sodium phosphate (tribasic or di-basic) or sodium oxalate, may be used. Such other materials, however, when combined with sodium chlorate, are not as effective in resisting moisture, as is zinc-dust. I, therefore, prefer to use zinc-dust in combination with the sodium chlorate, a close physical and mechanical mixing of the particles of the two ingredients being effected. The result of the combination is that the property of the sodium chlorate is entirely changed, in that it loses its hygroscopic tendency and can be efficiently used in proper proportion in match composition. Not only does the addition of the zinc-dust to the sodium chlorate perform the important function described, but it also promotes the ignitability of the mass.

In carrying out my invention in the preferred way I take sodium chlorate, add thereto, for example, about 25% zinc-dust, and thoroughly grind and mix the materials together. I then add this mixture in proper proportion to the combustible, flaming and binding ingredients of match combustion, taking care to keep the mass well stirred and agitated. I may use for this purpose any of the materials commonly used as match-head compositions, various mixtures containing a form of phosphorus and glue being suitable. The match splints are "dipped" in the usual manner into the aqueous pasty composition to produce the heads or bulbs or tips, which latter when dry are homogeneous and not easily affected by humid atmospheric conditions.

A specific illustration of the constituent parts, by weight, of a composition embodying my invention is as follows:

Sodium chlorate and zinc-dust mixture, 2½ parts; binder ¾ part; combustible and flaming material ⅜ part; filler 2½ parts.

Any of the commonly used fillers are suitable, barium carbonate, precipitated chalk, plaster of Paris, etc., being mentioned, merely as examples.

To increase the sensitiveness of the sodium chlorate as an oxidizer I may add to the composition an oxidizing salt of a heavier metal, such, for example, as potassium chlorate or barium chlorate, or both; efficient results being attained by incorporating in the composition potassium chlorate 1¼ parts, or barium chlorate 1½ parts, or potassium chlorate ¾ part and barium chlorate ½ part.

From the foregoing it will be seen that the characteristic feature of my invention resides in the association with sodium chlorate of zinc dust or similar functioning metal, and therefore it is to be understood that the proportions of these materials may be varied to meet particular requirements; and also that the remaining constituents of the composition may be changed as to nature and proportions without departure from the fair spirit of my invention.

In this specification, I have mentioned particularly the metal zinc, as typical of the various substances which have the property of counteracting or overcoming the hygroscopic tendency of the sodium chlorate, but obviously the invention is not restricted to the use of this specific metal. In the appended claims, the use of the term "zinc" is, of course, intended to cover the equivalents of this material, namely, any metal which will counteract or overcome the hydroscopic tendency of the sodium chlorate, and the said claims are to be so read, construed and understood.

I claim—

1. A match composition containing a mixture of sodium chlorate and zinc-dust.

2. A match composition composed of a mixture of sodium chlorate and zinc dust, other combustible and flaming material, a filler, and a binder.

3. A match composition composed of a mixture of sodium chlorate and zinc dust, an oxidizing salt of a metal heavier than sodium, other combustible and flaming material, and a binder.

4. A match composition composed of a mixture of sodium chlorate and zinc dust, potassium chlorate, other combustible and flaming material, and a binder.

5. A process of making a match composition which consists in intimately associating sodium chlorate and zinc dust, and then adding the mixture to an aqueous paste containing other combustible and flaming material and a binder.

6. A match composition composed of a mixture of sodium chlorate and zinc dust, potassium chlorate, barium chlorate, other combustible and flaming material, and a binder.

7. A match composition comprising sodium chlorate and the metal zinc in the form of a fine powder.

8. A match head composition comprising sodium chlorate, zinc in a fine state of subdivision, other flaming and combustible material and a binder.

Signed at New York, in the county and State of New York, this 9th day of August, A. D. 1915.

WILLIAM A. FAIRBURN.